United States Patent
Mesalic

(10) Patent No.: US 7,845,872 B2
(45) Date of Patent: Dec. 7, 2010

(54) MULTI-COLORED CRAYONS WITH ASSOCIATED PACKAGING

(75) Inventor: Admir James Mesalic, Las Vegas, NV (US)

(73) Assignee: Family Hospitality LLC, Las Vegas, NV (US)

( * ) Notice: Subject to any disclaimer, the term of this patent is extended or adjusted under 35 U.S.C. 154(b) by 917 days.

(21) Appl. No.: 11/695,783

(22) Filed: Apr. 3, 2007

(65) Prior Publication Data

US 2007/0163467 A1    Jul. 19, 2007

(51) Int. Cl.
*B43K 27/04* (2006.01)

(52) U.S. Cl. ............. 401/35; 401/34; 401/52; 401/131; D3/206

(58) Field of Classification Search ........ 401/6, 401/19, 34, 35, 52, 96, 131, 195; 206/436, 206/431, 443, 822; D3/206, 269
See application file for complete search history.

(56) References Cited

U.S. PATENT DOCUMENTS

| | | | |
|---|---|---|---|
| 471,191 A * | 3/1892 | Prewitt | 401/35 |
| 4,161,374 A | 7/1979 | Koeln et al. | |
| 4,251,163 A | 2/1981 | Chao | |
| 4,411,543 A | 10/1983 | Hashimoto et al. | |
| 4,544,296 A | 10/1985 | Jarvis et al. | |
| 4,762,493 A | 8/1988 | Anderson | |
| 5,113,765 A * | 5/1992 | Carey et al. | 102/336 |
| 5,477,983 A | 12/1995 | Davis | |
| 5,893,671 A | 4/1999 | Bellue | |
| 5,947,620 A | 9/1999 | Kageyama et al. | |
| 6,074,115 A * | 6/2000 | Fantinelli | 401/35 |
| 6,149,330 A | 11/2000 | Chuang | |
| 6,357,944 B1 * | 3/2002 | Reed et al. | 401/88 |
| 6,547,465 B1 | 4/2003 | Rago et al. | |
| 6,648,536 B1 | 11/2003 | Bellue | |
| 6,866,436 B2 | 3/2005 | Kanari et al. | |
| 6,887,006 B1 | 5/2005 | Carpenter | |
| 7,029,192 B2 | 4/2006 | Tsang | |
| 2002/0015159 A1 | 2/2002 | Hashimoto | |
| 2002/0081563 A1 | 6/2002 | You | |
| 2002/0083884 A1 | 7/2002 | McClosky | |
| 2002/0186995 A1 | 12/2002 | Iosilevich | |
| 2002/0197092 A1 | 12/2002 | Iosilevich | |
| 2003/0002911 A1 | 1/2003 | Berhin | |
| 2003/0178493 A1 | 9/2003 | Njolstad | |
| 2003/0232177 A1 | 12/2003 | Pearce | |
| 2004/0003505 A1 | 1/2004 | Wang | |
| 2004/0037608 A1 | 2/2004 | Cochran | |
| 2004/0076461 A1 | 4/2004 | Liu | |
| 2004/0212605 A1 | 10/2004 | Fitzmaurice et al. | |
| 2005/0063178 A1 | 3/2005 | Huang | |
| 2006/0041257 A1 | 2/2006 | Sartor et al. | |

FOREIGN PATENT DOCUMENTS

CN    2009-77796 Y    11/2007

* cited by examiner

*Primary Examiner*—David J Walczak
(74) *Attorney, Agent, or Firm*—Husch Blackwell LLP

(57) ABSTRACT

A crayon with a plurality of longitudinally extending color zones. The crayon has generally planar exterior side surfaces on the tip and shank forming vertices therebetween. A color zone bridges a vertex providing the same color of marking material on opposite sides of a respective vertex.

16 Claims, 2 Drawing Sheets

MULTI-COLORED CRAYONS WITH ASSOCIATED PACKAGING

BACKGROUND OF INVENTION

This invention relates to crayons and, more particularly, to crayons having at least three generally planar exterior surfaces and transverse cross-sections containing multiple zones of color, and associated packaging.

There are many examples of writing implements that allow for multiple marking elements, each with a different color, to be housed in the same implement. Examples include pencils with a different colored point at each end, pens containing multiple ink cartridges containing different colored inks whose points can be extended and used at will, and crayons having a transverse circular cross-section with multiple colors radiating outwardly from and running along a centrally disposed longitudinal axis, where the colors are generally transversely equally disposed through the cross section.

Circular crayons containing multiple color zones, however, do not allow for easy, discreet use of the individual colors. As the number of colors in the crayon increases, the exposed surface area of each color decreases. Attempting to press the correct part of the small, curved surface of a round crayon at the correct angle to a surface may be difficult, particularly for young children. Typically, the result of using a round crayon having multiple colors running along a centrally disposed longitudinal axis is an unintentional and unwanted mix of colors, especially when manufacture of these types of crayons result in non-uniform color disbursement through the color zones of the crayon.

Crayons with cylindrical shanks also have the problem of being difficult to handle, and not readily or reliably indexable. Other shapes have been used that are more ergonomic, such as shapes having a triangular or hexagonal transverse cross-section. A further benefit of some of these non-cylindrical instruments is that they do not roll as easily. There are some non-cylindrical writing implements that contain multiple colors, including crayons.

When dealing with crayons or other writing implements having transverse cross-sections of shapes other than circles, for example, triangles, rectangles, and so forth, containing multiple colors, the color zones interface along the lines bisecting vertices between interior surfaces. For example, when looking at a transverse cross-section of a triangular crayon containing three colors, the individual colors form isosceles triangles, with the vertex of the obtuse angle of each color meeting in the center of the cross-section. The three vertices of the transverse cross-section of the crayon will each be bisected by the interface of two color zones. Thus, it can be extremely difficult to use an individual color in a configuration such as this, because each vertex, as well as the point of the crayon, is composed of multiple colors.

Crayons with a round transverse cross-section are also an inefficiently packaged product. When placing cylindrical objects into a container with a rectangular transverse cross-section, there is a large amount of interstitial space. Even placing crayons with a transverse cross-section of an equilateral triangle into a container with a rectangular transverse cross-section creates interstitial space, though less than with cylindrical crayons. Also, stacking packages with rectangular transverse cross-sections can result in unstable stacks. Just as bricks are staggered when a building is constructed (bricking), so should rectangular packages of crayons. In some locations where the stacking of packages is utilized, such as in a store selling the packages of crayons, not bricking the packages could result in fallen stacks. Bricking takes quite a bit of time for planning and execution; it is slow; and it is thus costly.

Accordingly, a need remains for an improved design for crayons or other writing instruments, such as chalk, containing multiple colors, and improved packaging that can efficiently contain the crayons without being unstable when stacked.

SUMMARY OF INVENTION

The invention involves the provision of an elongate crayon having a wax-like core and a paper-like reinforcing outer cover (where wax-like includes wax and paper-like includes paper) with a transverse cross-section having at least three side surfaces, such as an equilateral triangle, a rectangle, a pentagon, or a hexagon, preferably having side surfaces of equal lengths and vertices of equal angles between adjacent side surfaces. The longitudinal side surfaces of the shank are generally planar. Further, for regular shapes, the crayon can contain the same number of colors as the transverse cross-section has vertices, such that each color zone forms a polygon in the form of a quadrilateral kite, a shape having two pairs of sides with each pair having of generally equal length (in the case of a transverse cross-sectional square, the kite formed by each color zone would, in fact, be a square). For example, when dealing with a crayon with an equilaterally triangular transverse cross-section, the two exposed surfaces of each kite would generally be of equal transverse length, and the two interface surfaces of each kite would generally be the same transverse length.

In the transverse cross-section, each color zone would have four vertices. For a triangular cross-sectional crayon, the central 120° angle of a color zone would be formed at the center of the cross-section by the connection of two color zone interfaces. Two opposing angles in the color zone are 90°, each of which is formed by bisecting adjacent faces of the cross-section with the color zone interfaces. The two adjacent outer surfaces connect to form the final 60° angle of the kite. Since each of these kites is a separate zone of color, and since each of these kites has a vertex formed at the intersection of two adjacent outer surfaces, each color can be easily and advantageously used on its own by marking with the distal end of the shank or with the tapered portion adjacent the shank, without accidentally encroaching on adjacent color zones, and may be readily indexed for use. The crayon may also be used to blend colors by using the point to mark. Other cross-sectional shapes are similarly constructed, but will yield different included angles.

Also, the present invention relates to the associated packaging for crayons having transverse cross-sections of a triangle. This type of packaging would waste nearly zero space, as the interstitial space would be greatly reduced to nearly nothing. Such packaging would be elongate as the crayons themselves are elongate, and could have transverse cross-sectional shapes of equilateral triangles, regular trapezoids, regular parallelograms, regular hexagons, and so forth. For example, with packaging having a transverse cross-sectional shape of an equilateral triangle, crayons would be longitudinally inserted into the packaging chamber, and could be packaged in numbers $N_i$ of:

$$N_1=1, N_2=4, N_3=9, N_4=16, \ldots, \text{ where } N_i=N_{i-1}+ [(2 \times i)-1], \text{ where } i=1 \ldots \infty$$

which numbers of crayons allow for the packages to have transverse cross-sections of equilateral triangles. Packing crayons in these numbers in an overall shape having a transverse cross-section of an equilateral triangle, where the crayons to be packaged have a transverse cross-section of an equilateral triangle, advantageously reduces the interstitial space and allows for easier and more stable stacking of the packages, as long as the packages are stacked in the same manner as the crayons are packaged.

BRIEF DESCRIPTION OF DRAWINGS

For a better understanding of the present invention, reference may be made to the accompanying drawings.

DETAILED DESCRIPTION

Figure 1:
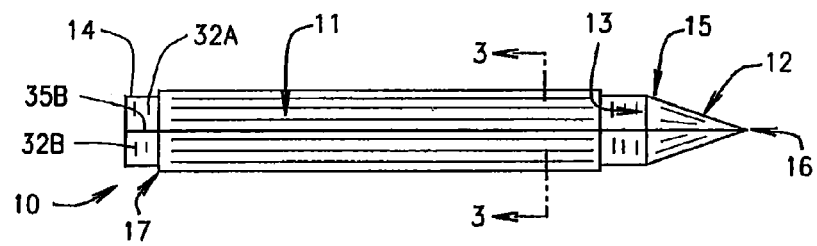
FIG. 1 is a side elevational view of a crayon having a triangular transverse cross-section.

According to the embodiment(s) of the present structures, various views are illustrated in FIGS. 1-11 and like reference numerals are used throughout to refer to like or similar parts or construction for the various views and Figures.

Figure 7:
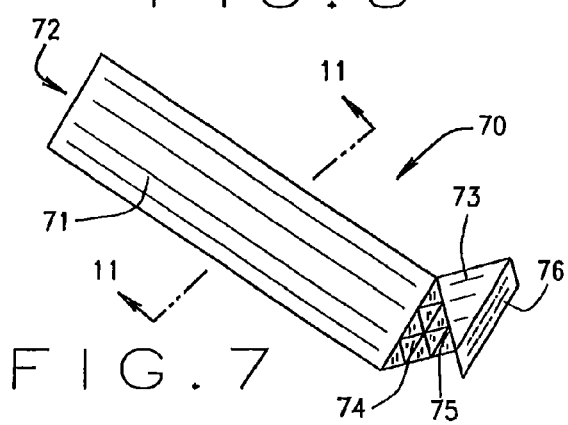
FIG. 7 is a perspective view showing packaging associated with triangular transverse cross-sectional crayons.
Figure 8:
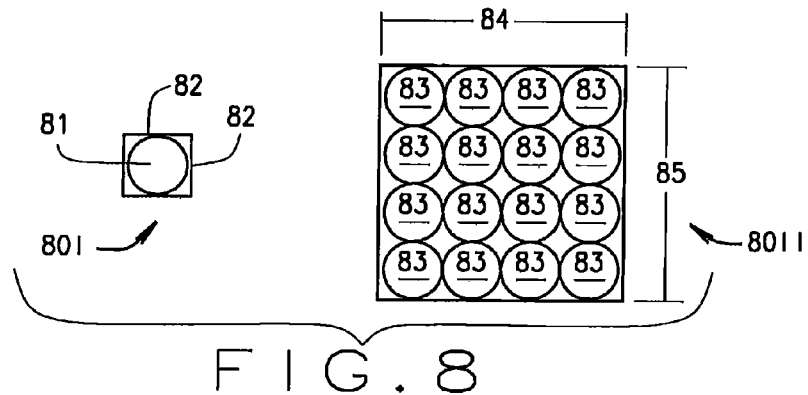
FIG. 8 is a transverse cross-sectional view of boxes having rectangular transverse cross-sections, which contain crayons having circular transverse cross-sections, taken through the shanks of the crayons.
Figure 11:
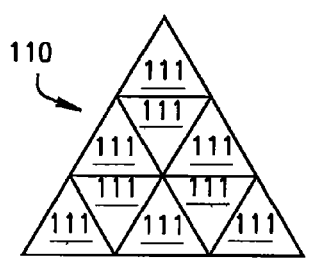
FIG. 11 is a transverse cross-sectional view of packaging with a transverse cross-section of an equilateral triangle, taken along line 11-11 in FIG. 7.

One embodiment of the present invention comprises multicolored elongate crayons 10 with transverse cross-sectional shapes having at least three generally planar sides wherein the color zones 31 (FIG. 3), 41 (FIG. 4), 51 (FIG. 5), and 61 (FIG. 6) meet at interfaces 36 positioned at approximately 90° angles to each of the external surfaces 32(A-C) (FIG. 3), 42(A-D) (FIG. 4), 52(A-E) (FIG. 5), and 62(A-F) (FIG. 6) of the transverse cross-section as opposed to at the vertices 35(A-C) (FIG. 3), 45(A-D) (FIG. 4), 55(A-E) (FIG. 5), and 65(A-F) (FIG. 6) of the transverse cross-section. Similarly shaped packaging 70 for crayons 10 can be provided which are shown in FIGS. 7 and 11 as having transverse cross-sections of equilateral triangles.

Figure 2:
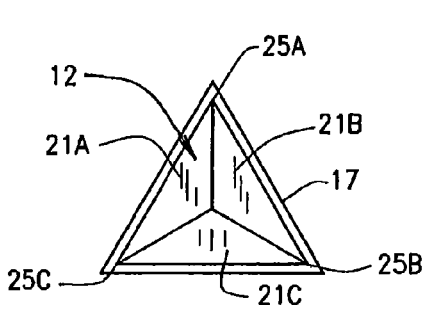
FIG. 2 is an end elevational view of the crayon shown in FIG. 1, as viewed from the right hand end of FIG. 1.
Figure 3:
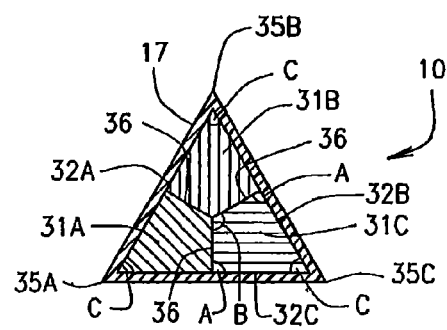
FIG. 3 is a transverse cross-sectional view of the crayon shown in FIG. 1, taken along line 3-3.
Figure 4:
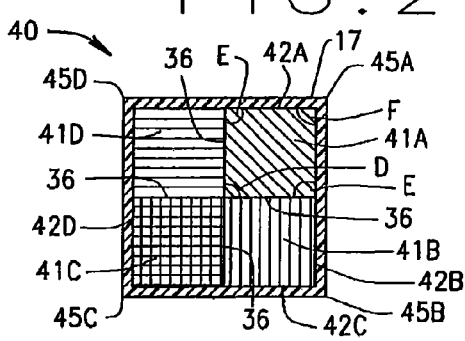
FIG. 4 is a transverse cross-sectional view of a crayon with a transverse cross-section of a square.
Figure 5:
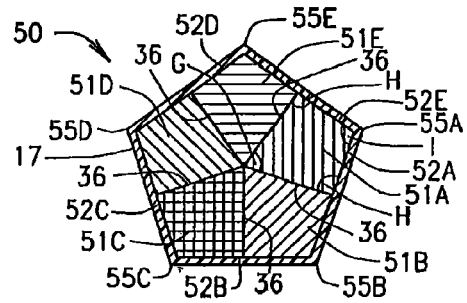
FIG. 5 is a transverse cross-sectional view of a crayon with a transverse cross-section of a regular pentagon.
Figure 6:
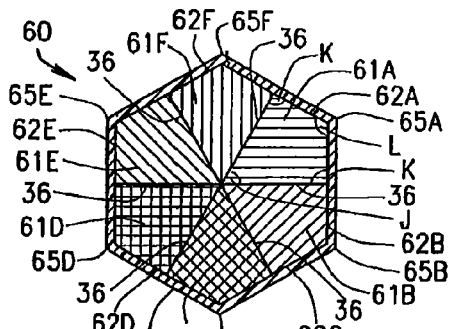
FIG. 6 is a transverse cross-sectional view of a crayon with a transverse cross-section of a regular hexagon.

The details of the invention and various embodiments can be better understood by referring to the Figures of the drawings. Referring to FIGS. 1-2, one embodiment includes an elongate crayon 10, with a shank 11 having a distal end 14 and a proximal end 13, and a wax-like, non-liquid core encompassed in a paper-like outer cover 17. The crayon 10 further has an end portion tip 12 axially extending from the proximal end 13 of the shank 11, tapering from the proximal end 15 of the tip 12 to the distal end 16 of the tip 12 adapted for engaging and marking a writing surface. The tip 12 tapers inwardly toward the central axis of the crayon 10 from the end 15 to the end 16. Referring to FIG. 2, the tapering end portion 12 is shown as having a transverse cross-section of an equilateral triangle, where all three major external surfaces 21A-C of the end portion 12 are, before use, generally planar and the same size and shape having vertices 25A-C between the outer surfaces 21A-C. However, the converging end portion 12 can have a transverse cross-section of other shapes than that shown in FIGS. 1-3, depending on the transverse shape of the shank 11. The shank 11 includes at least three major generally planar longitudinal outer surfaces which are shown as surfaces 32A-C joined at vertices 35A-C for a triangular crayon.

Referring to FIGS. 3-6, such crayons further have transverse cross-sections of preferably regular shapes wherein all external side surfaces are of generally equal width and length and all vertices 35, 45, 55, 65, e.g., 35A-C, are of generally equal angles; and where all surfaces for a crayon 10 are equidistantly spaced from a centrally disposed longitudinal axis. Such crayons also have a plurality of separate color zones 31, 41, 51, 61, e.g. 31A-C, equal to the number of vertices in the transverse cross-section of the crayon 10 at the shank 11.

The crayon 10 (FIGS. 1-3) has a triangular transverse cross-section containing three color zones 31A-C, each of which form the shape of a polygon with at least four sides (quadrilateral) or kite such that the central 120° angle B of each color zone 31, for example color zone 31C, would be formed at the center of the cross-section by the interface 36 between two color zones 31. Preferably, the color zones 31 A-C are similarly sized and shaped in transverse cross section. Two opposite angles A in a color zone 31, e.g. color zone 31C are 90°, each of which would be formed by bisecting adjacent outer surfaces 32B, 32C of the cross-section with the color zone interfaces 36. Preferably, the interfaces 36 are generally planar. The two adjacent outer surfaces 32B, 32C are illustrated as connected at the vertex 35C to form the final 60° angle C of the kite shaped color zone 31C. The vertices 35A, B also have an angle C of 60°. The vertices 35A-C are formed at the corners between the surfaces 32A-C.

The crayon 40 (FIG. 4) has a rectangular and preferably square transverse cross-section containing four color zones 41A-D, each of which form the shape of a polygon with at least four sides (quadrilateral) or kite (which, in the illustrated form, is also a square) such that the central 90° angles D of a color zone 41, for example color zone 41A, would be formed at the center of the rectangle by the interface 36 between two color zones. Two angles E in each color zone, e.g., color zone 41A are 90°, each of which would be formed by bisecting adjacent outer surfaces 42A, 42B of the cross-section with the color zone interfaces 36. The two adjacent outer surfaces 42A, 42B are illustrated as connected at the vertex 45A to form the final 90° angle F of the illustrated kite shaped rectangle and preferably the other color zones 41B-D are similarly constructed to square color zone 41A. The other color zones 41B-D are similarly constructed by the surfaces 42A-D and vertices 45B, C, D. The color zones 41A-D are preferably similarly sized and shaped in transverse cross section.

The crayon 50 (FIG. 5) has a regular pentagonal transverse cross-section containing five color zones 51A-E, each of which form the shape of a polygon of at least four sides (quadrilateral) or kite such that the central 72° angle G of a color zone 51, for example color zone 51A, would be formed at the center of the pentagon by the adjoining interfaces 36 of three color zones 51E, A, B. Two opposite angles H in the color zone 51A are 90°, each of which would be formed by bisecting adjacent outer surfaces 52A, 52E of the cross-section with the color zone interfaces 36. The two adjacent outer surfaces 52A, 52E are illustrated as connected at vertex 55A to form the final 108° angle I of the kite shaped color zone 51A. The other color zones 51B-E are similarly constructed with the surfaces 52A-E and vertices 55B-E. The color zones 51A-E are preferably similarly sized and shaped in transverse cross section.

The crayon 60 (FIG. 6) has a regular hexagonal transverse cross-section containing six color zones 61A-F, each of which form the shape of a quadrilateral or kite such that the central 60° angle J of a color zone 61, for example color zone 61A, would be formed at the center of the hexagon by two adjoining interfaces 36 between color zones. Two angles K in the color zone 61A would be 90°, each of which would be formed by bisecting adjacent outer surfaces 62A, 62B of the cross-section with the color zone interfaces 36. The two adjacent outer surfaces 62A, 62B are illustrated as connected at vertex 65A to form the final 120° angle L of the kite shaped color zone 61A. The other color zones 61B-F are similarly constructed with the surfaces 62A-F and vertices 65B-F. The color zones 61A-F are preferably similarly sized and shaped in transverse cross section.

Referring to FIG. 7, the package 70 associated with the crayons 10 above is an elongate container, similar in longitudinal length to the above described crayons and with a triangular transverse cross-section for use with the triangular cross-section crayon. Such container includes longitudinal panels 71 and end closures 72, 73 with end closure 73 being constructed for selectively closing one end 74 of the package 70 and bottom end closure 72 normally closing the other end of the package 70. The panels 71 and end closures 72, 73 define a storage compartment. The closure 73 is shown as a hinged flap that is triangular in shape and is attached along a hinge edge 75 of the closure 73 to one edge of the open end 74 of the container 70, such that said closure 73 can be folded to cover and close the open end 74 of the container. In addition, in order to secure the closure 73 in the closed position, a secondary generally rectangular flap 76 is attached at one of it's edges to one of the two free edges of the closure 73 such that when the closure 73 is folded into the closed position, the secondary rectangular flap 76 folds down into the open end 74 of the container selectively holding the closure 73 closed.

Referring to FIGS. 8-11, transverse cross-sectional views of various packages having different transverse cross-sections and containing crayons 10 are shown. Packing densities in the storage compartment in the container, defined as the area of the transverse cross-sectional area of the crayons at their shank divided by the total inside area of the transverse cross-section of the package, are much more efficient for crayons, packaged in numbers of four or more, having transverse triangular cross-sections than those with transverse circular cross-sections. In order to most efficiently fit a single cylindrical crayon 81 into a box 80I with a rectangular transverse cross-section, that cross-section should have sides 82 equal to the diameter of the circular transverse cross-section of the shank of crayon 81. This most efficient manner of packing a cylindrical crayon 81 into a box 80I with a rectangular transverse cross-section results in a packing density of 0.785, and thus 78.5% of the rectangular transverse cross-section of the package 80I is occupied by the cross-section of the crayon 81. Similarly, when efficiently packaging two or more cylindrical crayons 83 into a box 80II with a rectangular transverse cross-section, the width 84 of the box 80II should equal the diameter of the circular transverse cross-section of the crayons 83 multiplied by the number of columns of crayons 83 to be packaged, and the height 85 of the box 80II should equal the diameter of the circular transverse cross-section of the crayons 83 multiplied by the number of rows of crayons 83 to be packaged. Therefore, because each cylindrical crayon 83 is packaged in the same amount of space as is the individually packaged cylindrical crayon 81 above, the packing density will always be 0.785, and thus 78.5% of any box with a rectangular cross-section will be occupied by the transverse cross-section of cylindrical crayons when the crayons are packaged most efficiently.

Figure 9:
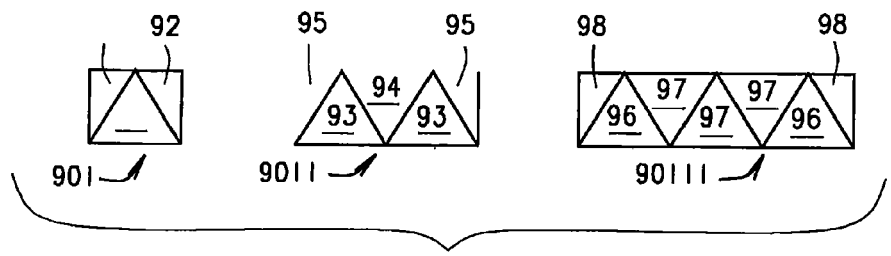
FIG. 9 is a transverse cross-sectional view of boxes having rectangular transverse cross-sections, which contain crayons having equilateral triangular transverse cross-sections, taken through the shanks of the crayons.
Figure 10:
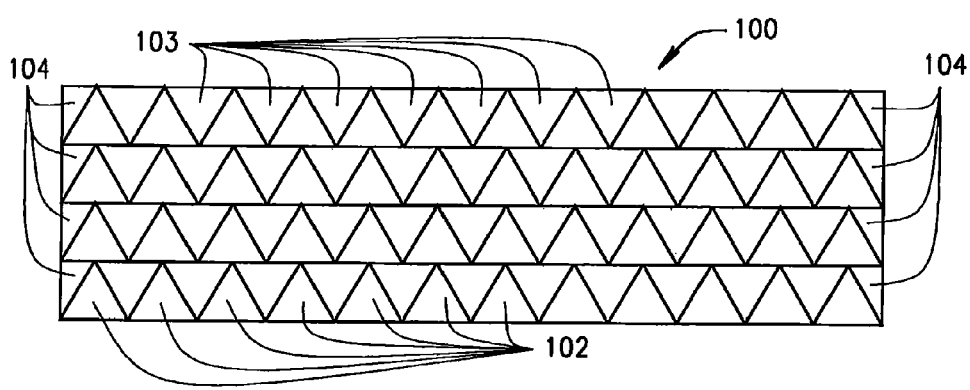
FIG. 10 is a transverse cross-sectional view of a larger box having a rectangular transverse cross-section, which contains crayons having equilateral triangular transverse cross-sections, taken through the shanks of the crayons.

However, when packaged most efficiently, the packing density of crayons with transverse cross-sections of equilateral triangles is not always the same. Referring to FIG. 9, when a single crayon 91 with a transverse cross-section of an equilateral triangle is most efficiently packaged in a box 90I with a rectangular transverse cross-section, half of the package's transverse cross-section is interstitial space 92. However, when two crayons 93 with transverse cross-sections of equilateral triangles are most efficiently packaged in a box 90II with a rectangular transverse cross-section, a third crayon 94 with a transverse cross-section of an equilateral triangle can be packaged in the interstitial space between the original two crayons 93. In this case, only one quarter of the package's transverse cross-section is interstitial space 95. When three crayons 96 with transverse cross-sections of equilateral triangles are most efficiently packaged in a box 90III with a rectangular transverse cross-section, a fourth and fifth crayon 97 with transverse cross-sections of equilateral triangles can be packaged in the interstitial space between the original three crayons 96. In this case, about 83.3% of the package's transverse cross-section is occupied, and only one-sixth of the package is interstitial space 98. Similarly, referring to FIG. 10, when packaging ninety two crayons with transverse cross-sections of equilateral triangles in four rows of twenty three crayons, the packing density rises to about 0.96, and thus 96% of the transverse cross-section of the rectangular box 100 is occupied and only about 4% is interstitial space 104. Therefore, as more crayons with equilaterally triangular transverse cross-sections are packaged in such a way as to allow extra equilaterally triangular transverse cross-sectional crayons 103 to be inserted into the interstitial space between crayons 102, the packing density rises and the space in the package is more efficiently used. The packing density is preferably at least about 0.9 and more preferably about 1.0. Indeed, as can be seen in FIG. 11, when crayons of equilaterally triangular transverse cross-sections 111 are packaged in an elongate package with an equilaterally triangular transverse cross-section, such as is seen in FIG. 7, there is nearly no interstitial space in the package 110. It follows that when crayons of generally rectangular transverse cross-section are packaged in an elongate package with a similarly generally rectangular transverse cross-section, there is similarly nearly no interstitial space.

The various multicolored transverse cross-sectionally shaped crayons and the packaging containers associated therewith shown above illustrate a novel crayon and associated packaging. A user of a multicolored crayon may color using any of the plurality of vertices 25A-C (FIG. 2), 35A-C (FIG. 3), 45A-D (FIG. 4), 55A-E (FIG. 5), 65A-F (FIG. 6) on the crayon without accidentally using unwanted colors. A crayon may be used to provide blended colors by marking with the end 16 of tip 12. In this regard, the tip or point 12 will provide a rainbow effect of the multiple colors. Marking with distinct, separate colors may be done by applying any of the vertices between adjacent outer surfaces at either the tip 12 or the shank 11 at or between the proximal end 13 or distal end 14 of the shank. Marking with each vertice individually provides a separate distinct color thereby effectively giving the user a plurality of single color crayons in one writing instrument. This can be extremely advantageous to a restaurant owner/operator, for example, because the restaurant owner would be able to enjoy a cost savings on their expenditures for crayons by giving away only one of the multicolored crayons, as compared to a package of three or more crayons each with a different color.

While the vertices 25, 35, 45, 55, 65 are shown as sharp points, it is recognized and anticipated that they can be initially curved or flat which might be considered to be a fifth surface for the polygon but still form a vertex wherein the cross-sectional shapes are still as described above. Also, a user of the packaged polygonal crayons, as described above, may make use of most all available space inside the package and may stack the packages more efficiently and effectively. In this regard, it is recognized that various forms of the subject various multicolored or single color transverse cross-sectionally shaped crayons and the triangular or other polygonal packaging container, e.g., rectangular, associated with a triangularly or rectangularly transverse cross-sectional crayon could be utilized without departing from the spirit and scope of the present invention. Still further, triangularly or rectangularly shaped packaging containers pack nicely into bulk containers or boxes and, in the case of triangular containers, such containers themselves can interlock with each other and improve the packing volume efficiencies as explained above.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A marking instrument of non-liquid marker material, said instrument including
   a shank with a plurality of generally planar longitudinal outer surfaces positioned relative to one another to form a generally uniform longitudinally extending transverse cross-sectional shape having at least three vertices along the length of the shank;
   a tip extending from one end of the shank, said tip having a distal end and a proximal end, said tip tapering inwardly from the proximal end to the distal end, at least a portion of the tip having a generally uniform transverse cross-sectional shape;
   the tip and shank being integral and including material for applying a mark to a substrate;
   wherein the tip and shank having a plurality of longitudinally extending color zones with each zone having a different color with the number of zones being equal to the number of vertices of the transverse cross-sectional shape, each color zone extending from the distal end of the tip to a distal end of the shank; and
   wherein at least two of the at least three colors are exposed on each shank outer surface such that each cross-sectional vertex is contained within a respective color zone.

2. The marking instrument as set forth in claim 1, wherein the shank includes three generally planar longitudinal outer surfaces positioned relative to one another to form a generally triangular transverse cross-sectional shape along the length of the shank.

3. The marking instrument as set forth in claim 2, wherein at least a portion of the tip includes a generally triangular transverse cross-sectional shape providing three vertices.

4. The marking instrument as set forth in claim 3, including a plurality of marking instruments contained in a container providing a packing density of at least about 0.83 in the area of the shanks.

5. The marking instrument as set forth in claim 3 including a plurality of marking instruments contained in a container with three generally planar longitudinal panels positioned relative to one another to form a generally triangular transverse cross sectional shape along the length of the container and having a plurality of instruments therein with a packing density of about 1.0 in the area of the shanks.

6. The marking instrument as set forth in claim 2, including a plurality of marking instruments contained in a container providing a packing density of at least about 0.83 in the area of the shanks.

7. The marking instrument as set forth in claim 2 including a plurality of marking instruments contained in a container with three generally planar longitudinal panels positioned relative to one another to form a generally triangular transverse cross sectional shape along the length of the container and having a plurality of instruments therein with a packing density of about 1.0 in the area of the shanks.

8. The marking instrument as set forth in claim 1, wherein the shank includes four generally planar longitudinal outer surfaces positioned relative to one another to form a generally rectangular transverse cross-sectional shape along the length of the shank.

9. The marking instrument as set forth in claim 8, wherein at least a portion of the tip includes a generally rectangular transverse cross-sectional shape providing four vertices.

10. The marking instrument as set forth in claim 9, including a plurality of marking instruments contained in a container providing a packing density of about 1.0 in the area of the shanks.

11. The marking instrument as set forth in claim 8, including a plurality of marking instruments contained in a container providing a packing density of about 1.0 in the area of the shanks.

12. The marking instrument as set forth in claim 1, including a plurality of marking instruments contained in a container providing a packing density of at least about 0.83 in the area of the shanks.

13. The marking instrument as set forth in claim 1 including a plurality of marking instruments contained in a container with three generally planar longitudinal panels positioned relative to one another to form a generally triangular transverse cross sectional shape along the length of the container and having a plurality of instruments therein with a packing density of about 1.0 in the area of the shanks.

14. The marking instrument as set forth in claim 1 further including a container for holding a plurality of said marking instruments therein.

15. The marking instrument as set forth in claim 14 wherein said container has a triangular transverse cross sectional shape.

16. A container of marking instruments comprising:

a plurality of marking instruments each including:

a shank with three planar longitudinal outer surfaces positioned relative to one another to form a generally uniform longitudinally extending triangular transverse cross-sectional shape having three vertices along the length of the shank;

a tip extending from one end of the shank, said tip having a distal end and a proximal end, said tip tapering inwardly from the proximal end to the distal end, at least a portion of the tip having a generally uniform transverse cross-sectional shape;

the tip and shank being integral and including material for applying a mark to a substrate;

wherein the tip and shank having at least one longitudinally extending color zone; and a container with opposite ends and having a plurality of side panels and a closure member at at least one said end, said container having a triangular transverse cross sectional storage compartment for holding a plurality of marking instruments therein, the packing density of the marking instruments in the storage compartment being 1.0 in the area of the shanks.

* * * * *